Sept. 11, 1956  J. GUERRERO  2,762,288
FEED MIXING MACHINE
Filed April 15, 1953  3 Sheets-Sheet 1
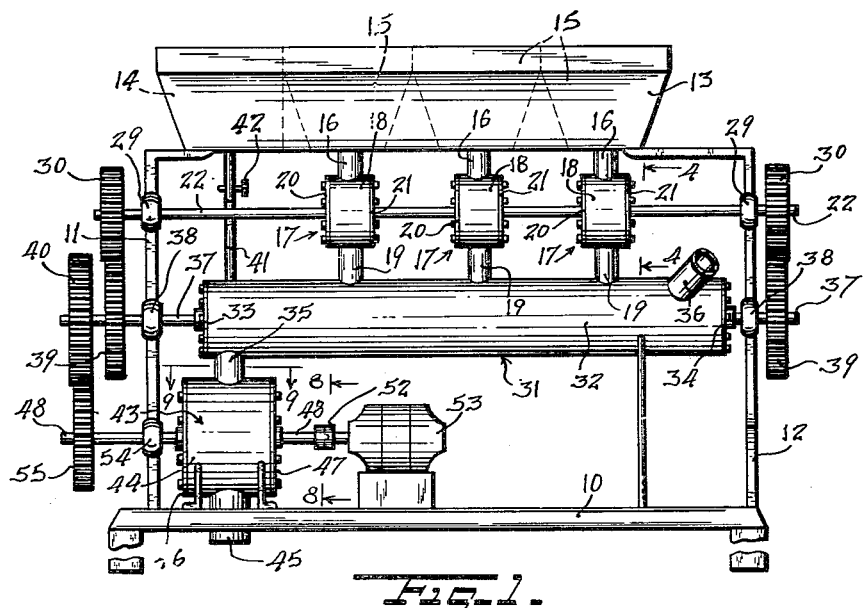
Fig. 1.
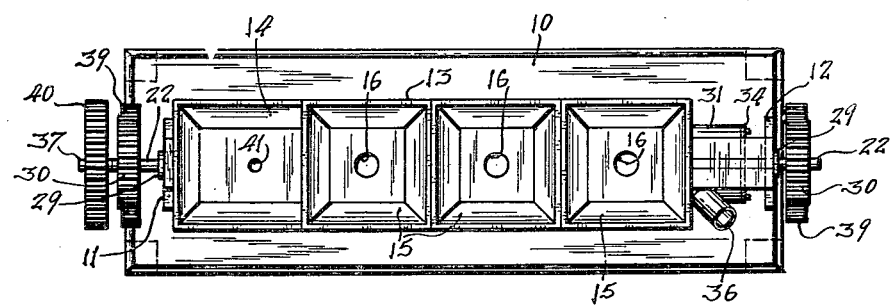
Fig. 2.
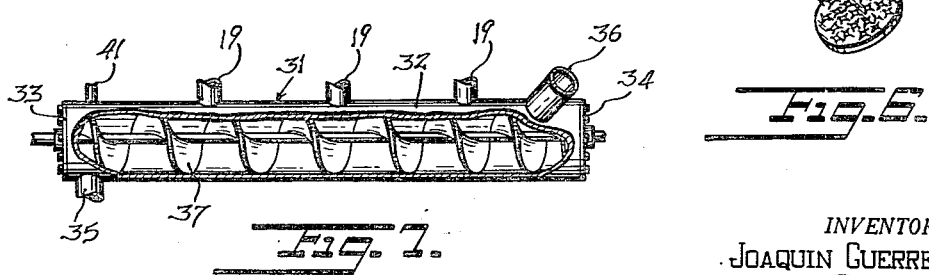
Fig. 7.
Fig. 6.
INVENTOR.
JOAQUIN GUERRERO
BY
ATTORNEY Sept. 11, 1956　　　　　　J. GUERRERO　　　　　　2,762,288
FEED MIXING MACHINE Filed April 15, 1953　　　　　　　　　　　　　　3 Sheets-Sheet 2

INVENTOR.
JOAQUIN GUERRERO
BY
ATTORNEY

Sept. 11, 1956  J. GUERRERO  2,762,288
FEED MIXING MACHINE
Filed April 15, 1953  3 Sheets-Sheet 3

INVENTOR.
JOAQUIN GUERRERO
BY
ATTORNEY 2,762,288

FEED MIXING MACHINE

Joaquin Guerrero, San Antonio, Tex.

Application April 15, 1953, Serial No. 348,916

3 Claims. (Cl. 99—235)

This invention relates to mixing devices and pertains more particularly to a mixing device for preparing livestock or poultry feeds.

One object of the present invention is to provide a novel mixing device wherein are included means for grating separately pluralities of feed ingredients and a common means for delivering the grated ingredients to a main mill wherein said ingredients are thoroughly mixed.

Another object of the present invention is to provide in a device having plural grating means for solid feed ingredients and a common means for delivering the grated solids to a main mill, other means whereby controlled amounts of liquid ingredients may also be fed to the common delivering means.

Another object of the present invention is to provide novel grating means for use with feed mixing devices.

Still another object of the invention is to provide in a feed mixing device a novel arrangement of shafting and gearing whereby an utmost of mechanical efficiency is attained in operating ingredient grating means, a conveying means and a main mill by means of a single power source.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a front elevational view illustrating the various components of the invention.

Fig. 2 is a plan view bringing out the internal construction of the hoppers and reservoir.

Fig. 6 is an isometric view of the grating elements.

Fig. 7 is a detail front elevational view of the elongated housing, broken away to show the screw conveyor therein.

Figure 3:
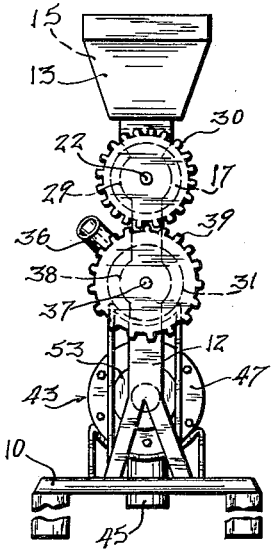
Fig. 3 is a side elevational view.

With reference to the drawings in more detail, and particularly to Figs. 1, 2 and 3, it will be seen that the present arrangement includes a four-legged base 10, and left and right supporting members 11 and 12, respectively. Supportedly mounted on arms extending inwardly from said supporting members is a box-like member 13 plurally divided so as to provide a liquid reservoir 14 and a plurality of hoppers 15. The walls of said hoppers 15 incline inwardly downward in order to assist in a gravitational feeding of the contents of said hoppers to outlet tubes 16, which outlet tubes lead said contents into grating drums 17. Said grating drums 17 are identical in construction and a description herein of but one will suffice.

Figure 4:
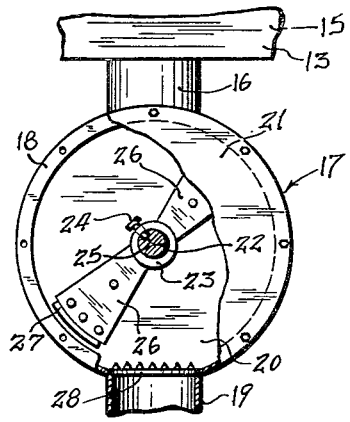
Fig. 4 is an enlarged detail side elevational view of one of the grating drums, part being broken away to show the disposition therein of the grating element and the vane assembly, and looking in the direction of the arrows 4—4 in Fig. 1.

As seen in Fig. 4, also, said grating drums 17 are each constructed to include a cylindrical member 18 having the said hopper outlet 16 entering thereinto from the top portion thereof, a drum outlet tube 19 at the bottom portion thereof, left and right cover plates 20 and 21, respectively, secured to either side of said cylindrical member 18, and a drive shaft 22, which is common to all the drums and is journalled in the said cover plates 20 and 21.

Figure 5:
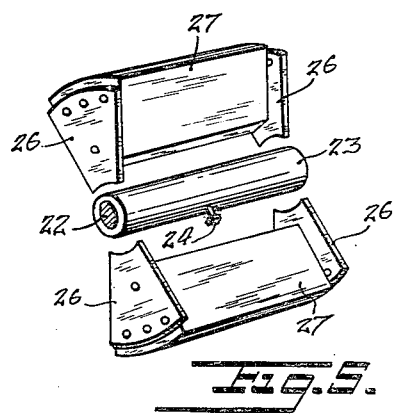
Fig. 5 is an exploded isometric view of the vane assembly.

Provided for being carried on the said shaft 22 inside each drum 17 is a sleeve 23 (Fig. 5 also), which sleeve, in consequence of a set screw 24 therein cooperating with a slot 25 in the shaft 22, is adapted to turn with said shaft. Fixedly secured, as by welding, to each side of said sleeve 23 are opposed side members 26, and mounted between the side members on either side of the sleeve 23 are vanes 27 which are preferably formed of wood.

Disposed and fixed by any suitable means in the bottom portion of the cylinder member 18 over the drum outlet tube 19 is a grating element 28, the purpose of which will be seen hereinafter.

The mentioned drive shaft 22 is journalled adjacent its extremities in hubs 29 (Fig. 1) formed on the said left and right supporting members 11 and 12, and secured to both extremities of said shaft are driven gears 30 adapted to be driven by other gears which will be described hereinafter.

Provided for having the grating drum outlet tubes 19 connected thereto along the top portion thereof, is an elongated cylindrical housing 31 (Fig. 7 also), comprising a cylindrical body member 32, left and right cover plates 33 and 34, respectively, a downwardly extending housing outlet 35 at one end of said body member and an upwardly extending auxiliary inlet 36 at the other end.

Located in said housing 31 and journalled between the end plates 33 and 34 thereof is an elongated screw conveyor 37 adapted, when turned, for delivering any contents of said housing 31 to the outlet 35 thereof. The extremities of said screw conveyor 37, which extend beyond the said cover plates, are journalled in hubs 38 (Fig. 1, also) formed on the above described supporting members 11 and 12. Outside of said hubs 38 driver gears 39 are secured to the extremities of said screw conveyor, which gears each mesh with a related one of the gears 30 fixed to the extremities of the hereinabove mentioned drive shaft 22. Also fixedly carried on the left extremity of the screw conveyor, outside of the driver gear 39, is a driven gear 40, the purpose of which will be seen hereinafter.

Interconnecting the liquid reservoir 14 and the housing 31 at a point intermediate the drum outlet tubes 19 and the housing outlet 35 is a pipe 41, which pipe includes a cock 42 for controlling any flow of liquid from said reservoir into said housing.

Figure 8:
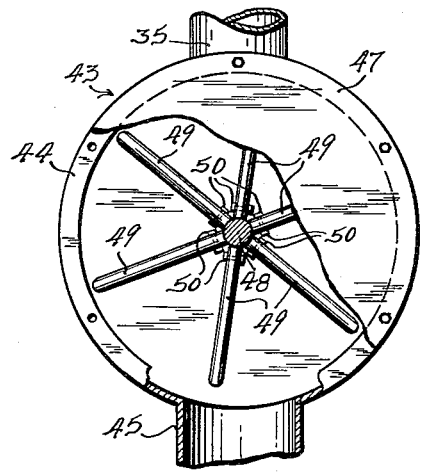
Fig. 8 is an enlarged detail side elevational view of the main mill, part being broken away to illustrate the mixing rods therein, looking in the direction of the arrows 8—8 of Fig. 1.
Figure 9:
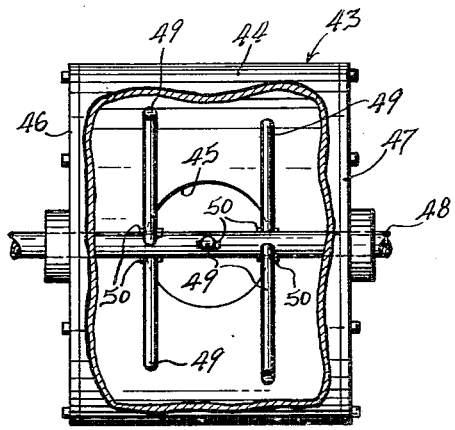
Fig. 9 is an enlarged detail plan view of the main mill, being broken away to illustrate the mixing rods, and looking in the direction of the arrows 9—9 of Fig. 1.

Provided for receiving the contents of said housing through said housing outlet 35 is a main mill 43 (see Figs. 8 and 9, also), comprising a cylindrical body member 44 having said housing outlet 35 entering thereinto at the top portion thereof and a mill outlet 45 at the bottom portion thereof, and left and right cover plates 46 and 47, respectively, suitably secured to the sides of said body member.

Journalled in the cover plates 46 and 47, is a mill shaft 48, which shaft is drilled plurally and diametrically for receiving therethrough a plurality of mixing rods 49, which rods extend in diversified directions and are maintained positioned in said shaft by pins 50 passing through said rods on either side of said shaft and peened at the ends for retention in said rods.

The right extremity of the mill shaft 48 is connected by a coupling 52 to any suitable and controllable driving means such as a motor 53. The left extremity of said mill shaft is mounted in a hub 54 also formed on the left supporting member 11. Beyond said hub 54, a driver gear 55 is fixed to the mill shaft 48, which gear is adapted to be in mesh with the driven gear 40.

The mentioned mill outlet 45 is preferably extended through the base 10, the purpose of which will be made clear hereinafter.

In operation, assorted solid ingredients are first loaded into the hoppers 15 and a liquid, which may be molasses or the like, is poured into the reservoir 14. Then the motor 53 is switched "on" and the mill shaft 48 is thereby driven, which shaft through its driver gear 55 and the driven gear 40 causes the said conveyor 37 to turn. As a result the conveyor driver gears 39 through the driven gears 30, cause the drive shaft 22 to turn.

Gravity feeds the solid ingredients from the various hoppers 15 to the spaces between the vanes 27 in the grating drums 17 and said vanes in turning with the shaft 22 bring said ingredients in contact with the grating elements 28 to thereby effect the grating thereof.

Through the drum outlet tubes 19, the grated ingredients are introduced into the housing 31 and the conveyor 37 turning therein delivers somewhat mixed the various grated ingredients to the housing outlet 35. The mentioned liquid ingredient may be introduced into the housing through the pipe 41 and the flow thereof may be controlled by the cock 42. Other ingredients may be introduced into the housing 31 through the auxiliary inlet 36.

Through the housing outlet 35, the already somewhat mixed ingredients are delivered to the main mill 43 wherein they are further and thoroughly mixed by the mixing rods 49 carried by and turning with the mill shaft 48.

The thoroughly mixed ingredients may be delivered through the mill outlet 45 to any suitable containers which may be disposed beneath the base 10 for facilitated filling thereof.

Figure 10:
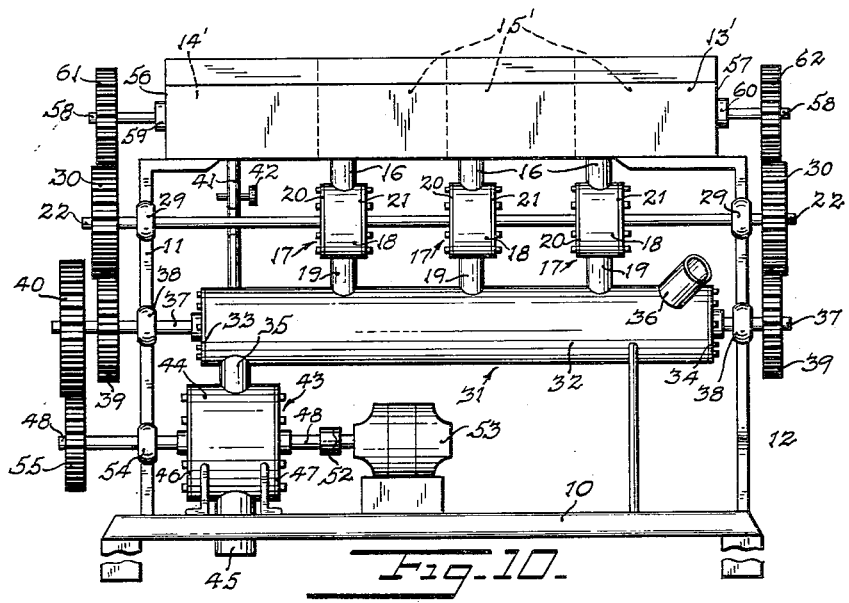
Fig. 10 is a front elevational view of a modified form of the invention.
Figure 11:
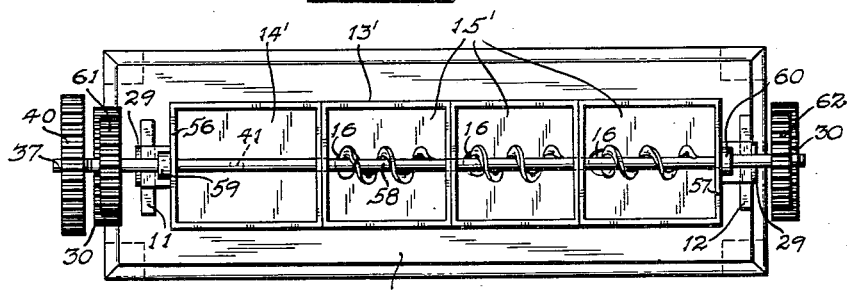
Fig. 11 is a top plan view thereof bringing out the internal construction of the hoppers and reservoir and showing the screw conveyor therein.
Figure 12:
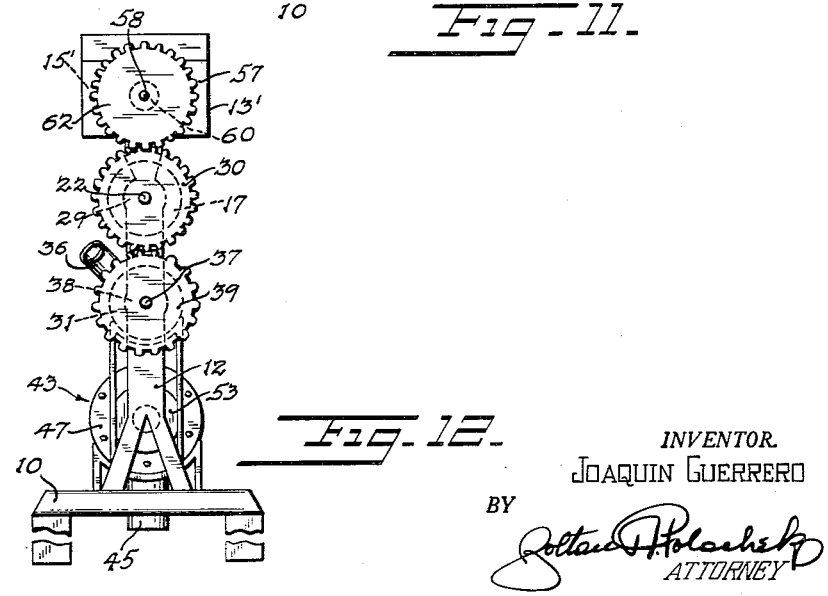
Fig. 12 is a side elevational view thereof.

Referring now to Figs. 10–12, there is shown a modified form of the invention differing from the first form in the construction and operation of a box-like member 13' and its liquid reservoir 14' and hoppers 15'.

Supportedly mounted on arms extending inwardly from the supporting members 11 and 12, is a modified box-like member 13' plurally divided so as to provide a liquid reservoir 14' and a plurality of hoppers 15', substantially as illustrated in Figs. 10 and 11. Outlet tubes 16 are provided at the base of the hoppers 15 as in the first form, said outlet tubes again leading into the grating drums 17.

Located in said box-like member 13' and journalled between the ends 56 and 57 thereof, is an elongated screw conveyor shaft 58 adapted, when turned, for delivering the contents of said hoppers 15' to the outlets 16 thereof. The extremities of said screw conveyor shaft 58, which extend beyond the ends 56 and 57, are journalled in hubs 59 and 60, formed on the above described ends 56 and 57. Outside of said hubs 59 and 60, driven gears 61 and 62 are secured to the extremities of said screw conveyor shaft, which gears each mesh with a related one of the gears 30, fixed to the extremities of the hereinabove mentioned drive shaft 22.

Interconnecting the liquid reservoir 14' and the housing 31, is the pipe 41, as in the first form. It will be noted that the screw conveyor shaft 58 passes through the reservoir 14' in the form of a shaft without the helical blades provided within hoppers 15'.

In other respects, the form of the invention shown in Figs. 10–12 is the same as that shown in Figs. 1–9, and like reference numerals identify like parts in each of the several views.

The operation of this form of the invention is the same as the first form with the exception that instead of a gravity feeding from the various hoppers 15', the rotation of gears 30 drives gears 61 and 62 to turn the screw conveyor shaft 58, which motion delivers the assorted solid ingredients to the outlets 16, whence they are processed in the same manner as the first form.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. The combination with a feed mixing device of the class described including a feed hopper, of grating means comprising a drum having an outlet and adapted to have the contents of said hopper fed gravitationally thereinto, a grating element disposed in said drum over said outlet, a shaft journalled centrally in the sides of said drum, a sleeve member fixedly fitted on said shaft inside said drum, a pair of opposed end members secured to each end of said sleeve, and vane members mounted opposedly between said end members, said vane members being effective when the shaft is turned for bringing the contents of said drum in contact with said grating element.

2. In a feed mixing device of the class described including a feed hopper having a rotatable conveyor therein, the combination with said hopper of a drum having an outlet and adapted to have the contents of said hopper fed thereinto by the conveyor, a shaft journalled in the sides of said drum, a grating element disposed in said drum over said outlet, a pair of opposed vane members carried by said shaft and effective when said shaft is turned for bringing the contents of said drum in contact with said grating element and means interconnecting the conveyor and said shaft.

3. The combination with a feed mixing device of the class described including a feed hopper having a rotatable conveyor therein, of grating means comprising a drum having an outlet and adapted to have the contents of the hopper fed thereinto by the conveyor, a grating element disposed in said drum over said outlet, a shaft journalled centrally in the sides of said drum, a sleeve member fixedly fitted on said shaft inside said drum, a pair of opposed end members secured to each end of said sleeve, and vane members mounted opposedly between said end members, said vane members being effective when the shaft is turned for bringing the contents of said drum in contact with said grating element, and means interconnecting said conveyor with said shaft.

References Cited in the file of this patent

UNITED STATES PATENTS

| | | |
|---|---|---|
| 706,837 | Lucas | Aug. 17, 1902 |
| 991,178 | Stock | May 2, 1911 |
| 1,228,640 | Belton | June 5, 1917 |
| 1,500,690 | Villiamo | July 8, 1924 |
| 1,825,475 | Pfeiffer | Sept. 29, 1931 |
| 1,877,266 | Chapin et al. | Sept. 13, 1932 |
| 2,012,416 | Bartels | Aug. 27, 1935 |
| 2,582,244 | Faith-Ell | Jan. 15, 1952 |